United States Patent [19]
Ford et al.

[11] Patent Number: 5,963,947
[45] Date of Patent: Oct. 5, 1999

[54] TECHNIQUE OF DYNAMICALLY ADDING FUNCTIONALITY FROM A CLIENT TO MANIPULATED DATA AT A SERVER

[75] Inventors: Daniel Alexander Ford; Tobin Jon Lehman, both of Los Gatos, Calif.

[73] Assignee: International Business Machines Corporation, Armonk, N.Y.

[21] Appl. No.: 09/013,768

[22] Filed: Jan. 27, 1998

[51] Int. Cl.$^6$ .................................................. G06F 15/173
[52] U.S. Cl. .......................... 707/10; 707/3; 395/200.33; 395/200.58
[58] Field of Search ............................ 707/10, 3, 9, 103; 395/200.33, 200.38, 200.49, 200.58, 683, 200.31

[56] References Cited

U.S. PATENT DOCUMENTS

| | | | |
|---|---|---|---|
| 5,097,533 | 3/1992 | Burger et al. | 395/500 |
| 5,117,349 | 5/1992 | Tirfing et al. | 395/600 |
| 5,129,086 | 7/1992 | Coyle, Jr. et al. | 395/650 |
| 5,201,046 | 4/1993 | Goldberg et al. | 395/600 |
| 5,394,546 | 2/1995 | Hanatsuka | 395/600 |
| 5,504,885 | 4/1996 | Alashqur | 395/600 |
| 5,504,886 | 4/1996 | Chang et al. | 395/600 |
| 5,566,330 | 10/1996 | Sheffield | 395/600 |
| 5,619,685 | 4/1997 | Schiavone | 395/500 |
| 5,659,751 | 8/1997 | Heninger | 395/685 |
| 5,692,157 | 11/1997 | Williams | 395/500 |
| 5,706,505 | 1/1998 | Fraley et al. | 707/103 |
| 5,758,074 | 5/1998 | Marlin et al. | 395/200.8 |
| 5,758,087 | 5/1998 | Aaker et al. | 395/200.62 |
| 5,802,298 | 9/1998 | Imai et al. | 395/200.47 |
| 5,826,270 | 10/1998 | Rutkowski et al. | 707/10 |
| 5,838,972 | 11/1998 | Matsuzuka et al. | 395/685 |
| 5,848,246 | 12/1998 | Gish | 395/200.58 |
| 5,850,517 | 12/1998 | Verkler et al. | 395/200.32 |
| 5,892,946 | 4/1999 | Woster et al. | 709/300 |

OTHER PUBLICATIONS

D. Gelernter, et al., "ACM Sigact–Sigops Symposium on Principles of Distributed Computing", ACM, pp. 10–18, Aug. 1982.

T. Lehman, et al., "An Evaluation of Starburst's Memory Resident Storage Component", IEEE Transactions on Knowledge And Data Engineering, vol., 4, No. 6, pp. 555–566, Dec. 1992.

H.E. Bal, et al., "Programming Languages For Distributed Computing Systems", ACM Computing Surveys, vol. 21, No. 3, pp. 262–322, Sept. 1989.

R. Ananthanarayanan, et al., "Using The Co–Existence Approach to Achieve Combined Functionality of Object–Oriented And Relational Systems", ACM, pp. 109–118, 1993.

N. Carriero, et al., "Linda In Context: How Can A System That Differs Sharply From All Currently Fashionable Approaches Score Any Kind of Success? Here's How." ACM, vol., 32, No. 4, pp. 444–458, Apr. 1989.

D. Gelernter, "Generative Communication in Linda", ACM Transactions on Programming Languages and Systems, vol. 7, No. 1, pp. 80–112, Jan. 1985.

JavaSpace™ Specification, pp. 1–40, Jun. 27, 1997.

D. Curtis, "Java, RMI and CORBA", OMG Corba News, pp. 1–9, 1997.

W. Litwin, "Linear Hashing: A New Tool For File And Table Addressing", IEEE Computer Society, pp. 212–223, 1980.

T. Lehman, et al., "A Study of Index Structures For Main Memory Database Management Systems", Proceedings of the Twelfth International Conference on Very Large Data Bases, pp. 294–303, Aug. 1986.

*Primary Examiner*—Jean R. Homere
*Attorney, Agent, or Firm*—Merchant & Gould

[57] ABSTRACT

A method, apparatus, and article of manufacture for dynamically adding functionality to a server. A first operator is received at the server from an attached client, wherein the first operator indicates that new functionality is to be added to the server. A first handler is located for the first operator. The first handler is executed in the server, wherein the first handler registers a second operator associated with the new functionality and installs a second handler for the second operator to perform the new functionality.

38 Claims, 4 Drawing Sheets

TECHNIQUE OF DYNAMICALLY ADDING FUNCTIONALITY FROM A CLIENT TO MANIPULATED DATA AT A SERVER

BACKGROUND OF THE INVENTION

1. Field of the Invention

The present invention generally relates to computer-implemented database management systems, and in particular, to a method for dynamically adding functionality to a database management system executed by a server computer.

2. Description of Related Art

Database systems are large monolithic structures that offer a fixed amount of functionality. To increase functionality of a database system, a highly skilled database system developer must open the source code and painstakingly manipulate it, e.g., adding and modifying the source code, compiling it, testing it, and finally releasing it to customers. This cycle can take anywhere from months to years. In addition, once a new system is produced, the user must stop the old database system, install the new system, then run the new system, before the new function can be used.

Thus, there is a need in the art for mechanisms that allow developers and users to add new functionality to a database system dynamically, thereby giving users access to new features immediately. The present invention solves these and other problems, as discussed further herein.

SUMMARY OF THE INVENTION

To overcome the limitations in the prior art described above, and to overcome other limitations that will become apparent upon reading and understanding the present specification, the present invention discloses a method, apparatus and article of manufacture for dynamically adding functionality to a server. A first operator is received at the server from an attached client, wherein the first operator indicates that new functionality is to be added to the server. A first handler is located for the first operator. The first handler is executed in the server, wherein the first handler registers a second operator associated with the new functionality and installs a second handler for the second operator to perform the new functionality.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
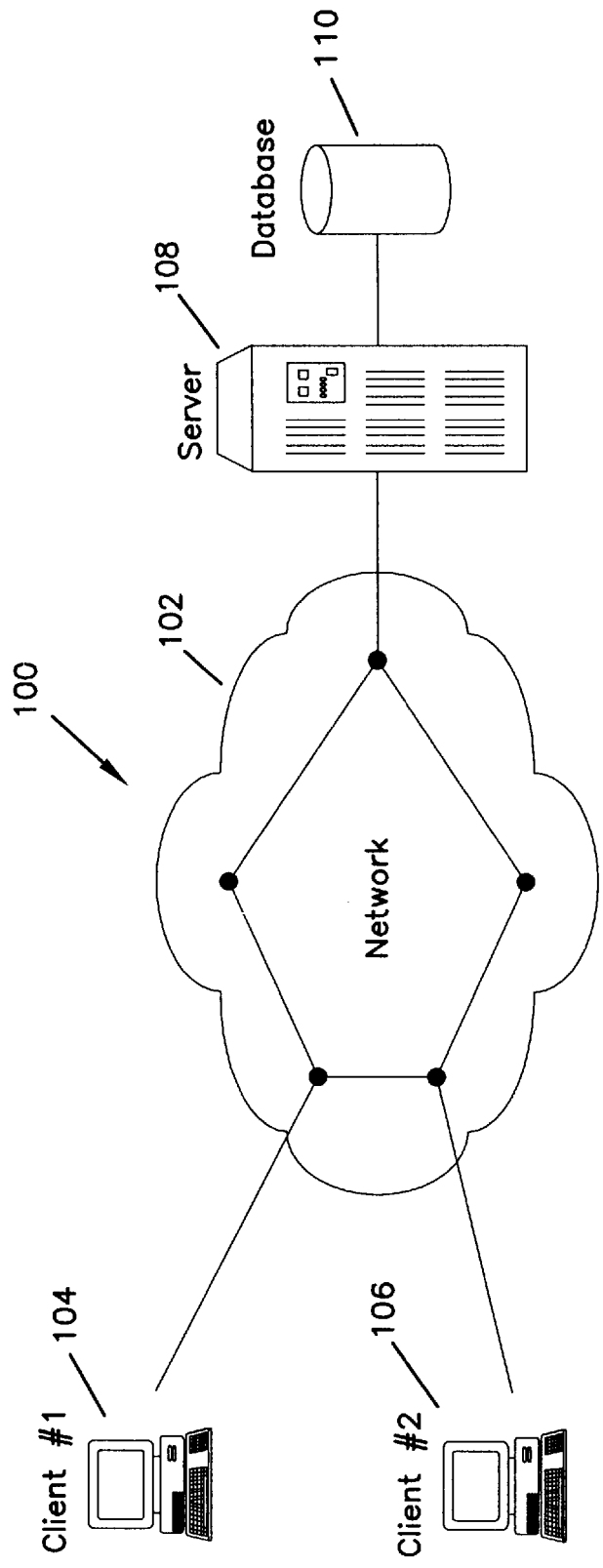
FIG. 1 schematically illustrates the environment of the preferred embodiment of the present invention, and more particularly, illustrates a typical distributed computer system using a network to connect T Spaces clients to a T Spaces server.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention, known as "T Spaces," comprises a network middleware system that uses a Tuplespace model of interaction for building a globally visible communication buffer. The Tuplespace model is further described in the following: David Gelernter and Arthur J. Bernstein, "Distributed Communication via Global Buffer," PODC 1982, pp. 10–18, 1982 (hereinafter referred to as Gelernter 82); Nicholas Carriero and David Gelernter, "Linda in Context," CACM 32(4), pp. 444–458, 1984 (hereinafter referred to as Carriero 84); and David Gelernter, "Generative Communication in Linda," TOPLAS 7(1), pp. 80–112, 1985 (hereinafter referred to as Gelernter 85); all of which are incorporated by reference herein.

T Spaces is a superset of the Tuplespace model, with some significantly extended functionality. The present invention extends the power of Tuplespace with database features traditionally found in large enterprise database systems. And further, the present invention provides the ability to download new functionality dynamically. This combination results in a framework that provides at once a lightweight database, an extensible computation environment, and a secure yet easy-to-use communication layer.

Tuplespace

A Tuplespace is a globally shared, associatively addressed memory space that is organized as a grouping of tuples. The Tuplespace concept was originally proposed by Gelernter in [Gelernter 82] and [Gelernter 85], both of which are incorporated by reference herein, as part of the Linda coordination language. The combination of a standard sequential computation language (such as C or Fortran) and a small number of Tuplespace communication primitives produces a complete parallel programming language (e.g., C-Linda or Fortran-Linda).

The basic element of a Tuplespace system is a tuple, which is simply a vector of typed values or fields. Templates are used to associatively address tuples via matching techniques. A template (or anti-tuple) is similar to a tuple, but some (zero or more) fields in the vector may be replaced by typed placeholders (with no value) called formal fields. A formal field in a template is said to match a tuple field if they have the same type. If the template field is not formal, both fields must also have the same value. A template matches a tuple if they have an equal number of fields and each template field matches the corresponding tuple field.

Table 1 below illustrates some simple tuples and templates.

TABLE 1

SIMPLE TUPLE EXAMPLES

| Sample Tuple | Description | Does the Sample Match the Template (Float, "Hello World" int) | Does the Sample Match the Template (Float, String, 345.0) |
| --- | --- | --- | --- |
| <2.24, "hello world", 345> | A tuple with three fields: (1) a float with the value 2.24, (2) a string with the value "hello world", and (3) an integer with the value 345. | Yes | No |
| <2,24, "hello world", 345.0> | A tuple with three fields: (1) a float with the value 2.24, (2) a string with the value "hello world", and (3) a float with the value 345.0. | No | Yes |
| <> | A tuple with 0 fields. | No | No |

A tuple is created by a process and placed in the Tuplespace via a write primitive. Tuples are read or removed with read and take primitives, which take a template and return the first matching tuple. (Note that, because the space is unstructured, the choice among multiple matching tuples is arbitrary and implementation-dependent.) Most Tuplespace implementations provide both blocking and non-blocking versions of the tuple retrieval primitives. A blocking read, for example, waits until a matching tuple is found in the Tuplespace, while a non-blocking version will return a "tuple not found" value if no matching tuple is immediately available.

Tuplespace provides a simple yet powerful mechanism for inter-process communication and synchronization, which is the crux of parallel and distributed programming. A process with data to share "generates" a tuple and places it into the Tuplespace. A process requiring data simply requests a tuple from the space. Although not quite as efficient as message-passing systems, Tuplespace programs are typically easier to write and maintain, for a number of reasons:

Destination uncoupling (fully anonymous communication): Most message passing systems are partially anonymous: it is not necessary for the receiver of a message to identify the sender, but the sender always has to specify the receiver. The creator of a tuple, however, requires no knowledge about the future use of that tuple, or its destination.

Space uncoupling: Since tuples are retrieved using an associative addressing scheme, multiple address-space-disjoint processes access tuples in the same way.

Time uncoupling: Tuples have their own lifespan, independent of the processes that generated them, or any processes that may read them. This enables time-disjoint processes to communicate seamlessly.

Tuplespace extends message passing systems with a simple data repository that features associated addressing. Conceptually, it ranks above a pure message passing system in terms of function, but far below relational database systems, since most implementations do not include transactions, persistence or any significant form of query facility.

Research into Tuplespace systems has proceeded at a steady pace for the past fifteen years, but has been primarily targeted at the high-performance parallel computing market. Recently, interest in Tuplespace has developed among researchers in distributed systems. For example, SUN Microsystems has recently publicized an internal project based on Tuplespaces, called "Javaspaces", as described in the JavaSpace™ Specification, Revision 0.4, Sun Microsystems, Inc., 1997, which is incorporated by reference herein. Also, computer science departments at universities around the country are now giving programming assignments that feature Tuplespaces in Java™.

The fundamental advantage of a Tuplespace system is flexibility. Lacking a schema, a Tuplespace does not restrict the format of the tuples it stores or the types of the data that they contain. Since the needs of modern distributed systems primarily revolve around flexibility, Tuplespace is an obvious choice.

The scalability of a Tuplespace system is provided by the complete anonymity of tuple operations. There is no need for either server or client to keep track of connected processes.

Time uncoupling is provided by the database-like character of the Tuplespace, whose lifetime is independent of any client process. Furthermore, the simplicity of a Tuplespace system enables it to run in a limited environment. Finally, the self-defining nature of tuple communication allows a significant degree of inter-operability and extensibility.

T Spaces

The present invention, which is known as "T Spaces" is a network middleware system that is implemented in the Java™ programming language and thus it automatically possesses network ubiquity through platform independence, as well as a standard type representation for all datatypes. T Spaces extends the basic Tuplespace model with data management functions and the ability to download both new semantic functionality.

The salient features of T Spaces are:

Tuplespace Operator Superset: T Spaces implements the standard set of Tuplespace operators: read, in (take), and out (write). In addition, it includes both blocking and non-blocking versions of take and read, set oriented operators such as scan and consuming scan.

Persistent Data Repository: T Spaces employs database functions similar to heavy-weight relational database systems, to manage its data. T Spaces operations are performed in a transactional context, which ensures the integrity of the data.

Database Indexing and Query Capability: T Spaces indexes data for highly efficient retrieval. The expanded query capability provides applications with the tools to probe the data with detailed queries, while still maintaining a simple, easy-to-use interface.

Dynamically Modifiable Behavior: In addition to the expanded set of built-in operators, T Spaces allows new operators to be defined dynamically, downloaded into the T Spaces server, and used immediately. This is in contrast to relational database systems that have limited dynamic function (usually in the form of triggers).

Access Controls: Users can establish security policies by setting user and group permissions on a Tuplespace basis.

T Spaces is appropriate for any application that has distribution or data storage requirements. It can perform many of the duties of a relational database system without imposing an overly restrictive (and primitive) type system, a rigid schema, a clumsy user interface or a severe runtime memory requirement. In a sense, it is a database system for the common everyday computer, e.g., one that doesn't generate complex SQL queries, but one that needs reliable storage that is network-accessible.

FIG. 1 schematically illustrates the environment of the preferred embodiment of the present invention, and more particularly, illustrates a typical distributed computer system 100 using a network 102 to connect one or more T Spaces clients 104 and 106 to a T Spaces server 108. A typical combination of resources may include clients 104 and 106 that are implemented on personal computers or workstations, and servers 108 that are implemented on personal computers, workstations, minicomputers, or mainframes. The network 102 may comprise networks such as LANs, WANs, SNA networks, and the Internet.

Following the Tuplespace model, a T Spaces client 104 or 106 communicates with the T Spaces server 108 via tuples, i.e., ordered vectors of fields that each describe a type and a value. Moreover, the T Spaces clients 104 and 106 communicate with each other via the T Spaces server 108.

For example, T Spaces client 104 may issue a write call to insert a <test1> tuple into the T Spaces server 108. The <test1> tuple is sent to the T Spaces server 108, where it is stored in a T Spaces database 110 managed by the T Spaces server 108. Then, T Spaces client 106 issues a read query, specifying <test1> as the query template. The query template is sent to the T Spaces server 108 and is used to query the T Spaces database 110. The <test1> tuple is found, and a copy of the tuple is returned to the T Spaces client 106.

The present invention is generally implemented using computer programs, which are executed by the T Spaces clients 104 and 106 and/or the T Spaces server 108. These computer programs cause the T Spaces clients 104 and 106 and/or the T Spaces server 108 to perform the desired functions as described herein. Generally, the computer programs are tangibly embodied in and/or readable from a device, carrier, or media, such as a memories, data storage devices, and/or remote devices coupled to the computer via data communications devices. Thus, the present invention may be implemented as a method, apparatus, or article of manufacture using standard programming and/or engineering techniques to produce software, firmware, hardware, or any combination thereof. The term "article of manufacture" (or alternatively, "computer program carrier") as used herein is intended to encompass any device, carrier, or media that provides access to instructions and/or data useful in performing the same or similar functionality. Of course, those skilled in the art will recognize many modifications may be made to this configuration without departing from the scope of the present invention.

Basic T Spaces Tuple Commands

The basic T Spaces tuple operations are write, take, and read, wherein write operations store a tuple argument in the T Spaces database 110, and take operations and read operations each use a template argument which is "matched" against the tuples in the T Spaces database 110. A take operation removes and returns the first matching tuple in the T Spaces database 110, while a read operation returns a copy of the matched tuple, leaving the T Spaces database 110 unchanged. If no match is found, take and read operations each return the Java™ type null, and leave the T Spaces database 110 unchanged. Blocking versions of these operations are also provided, e.g., wait-to-take and wait-to-read, which (if no match is found) block until a matching tuple is written by another process. (Linda programmers will recognize the semantics of these primitives as out, inp, rdp, in and rd.)

T Spaces also extends the standard Tuplespace with scan, consuming-scan, and count operations. Scan and consuming-scan operations are multi-set versions of read and take, respectively, and return a "tuple of tuples" that matches the template argument. The count operation simply returns an integer count of the matching tuples.

T Spaces Clients

Figure 2:
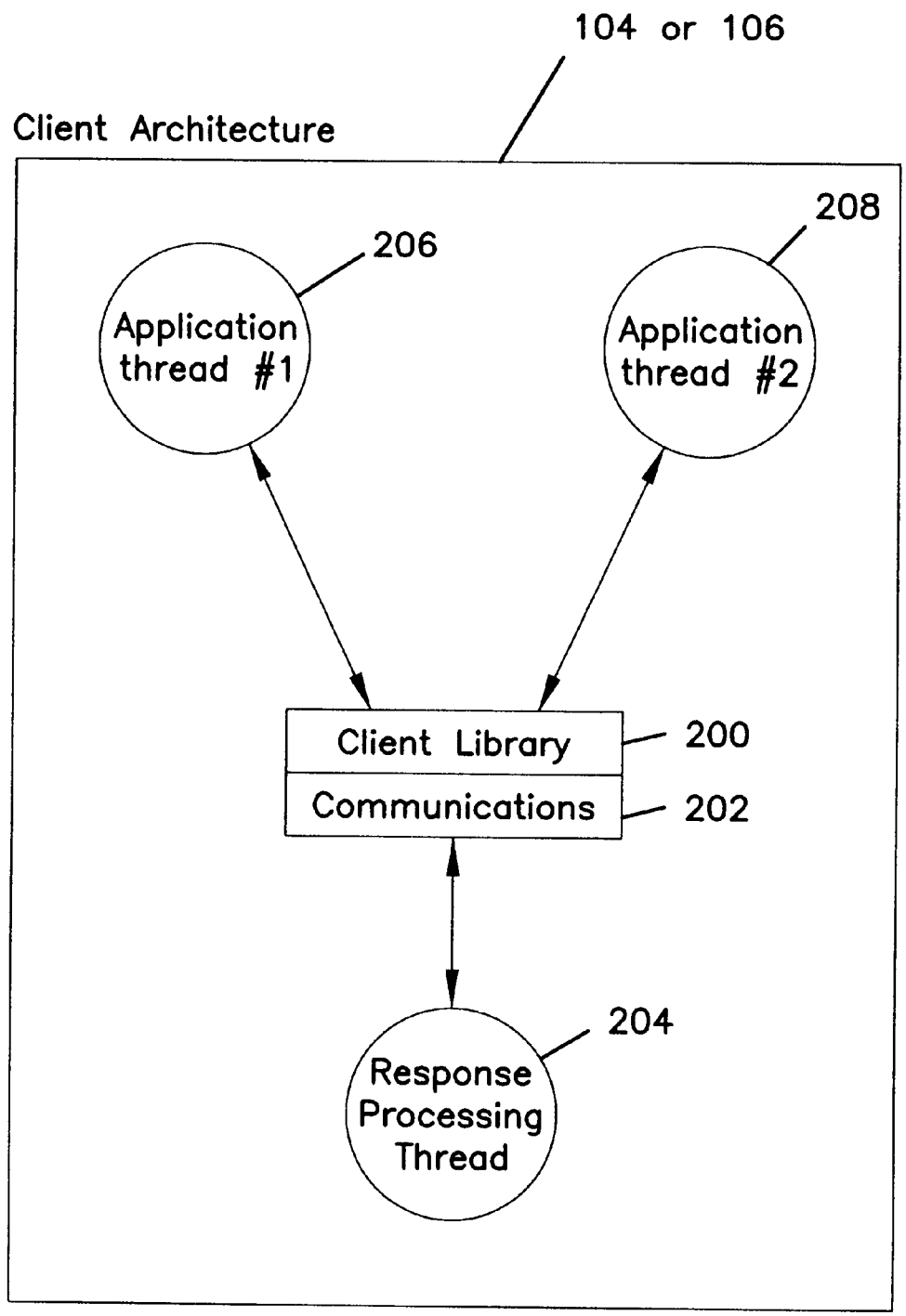
FIG. 2 illustrates the implementation of the T Spaces client according to the present invention.

FIG. 2 illustrates the implementation of the T Spaces client 104 or 106 according to the present invention. The client 104 or 106 includes a client library 200 that comprises a Tuplespace class, a communication library 202 for sending commands or requests to the T Spaces server 108, and a response processing thread 204 that processes responses received from the T Spaces server 108. In this example, the T Spaces client 104 or 106 executes two application threads 206 and 208. The application threads 206 and 208 manipulate instances of the Tuplespace class from the client library 200, which use the communication library 202 to send requests to the T Spaces server 108. Application threads 206 and 208 share a single monitor-protected outgoing TCP/IP stream, while the response processing thread 204 handles the single incoming TCP/IP stream.

All communication between the T Spaces client 104 or 106 and T Spaces server 108 is preferably non-blocking. In this way, multiple threads in the same Java™ virtual machine of the T Spaces client 104 or 106 can share a single TCP/IP connection to each T Spaces server 108. If a thread in a T Spaces client 104 or 106 issues a blocking request, it is blocked in the communication library 202 after sending the request and is awoken by the response processing thread 204 when the response arrives.

The response processing thread 204 associates responses from the T Spaces server 108 with requests from the application threads 206 or 208 using a list of outstanding requests, wherein each request is assigned a unique request identifier. A callback object is inserted into the outstanding request list using the request identifier as a key, wherein the callback object has two methods: (1) a wait-for-response method decrements a semaphore, thereby blocking the requesting application thread 206 or 208 until the response arrives; and (2) a call method increments the semaphore, thereby unblocking the requesting application thread 206 or 208.

T Spaces Server

Figure 3:
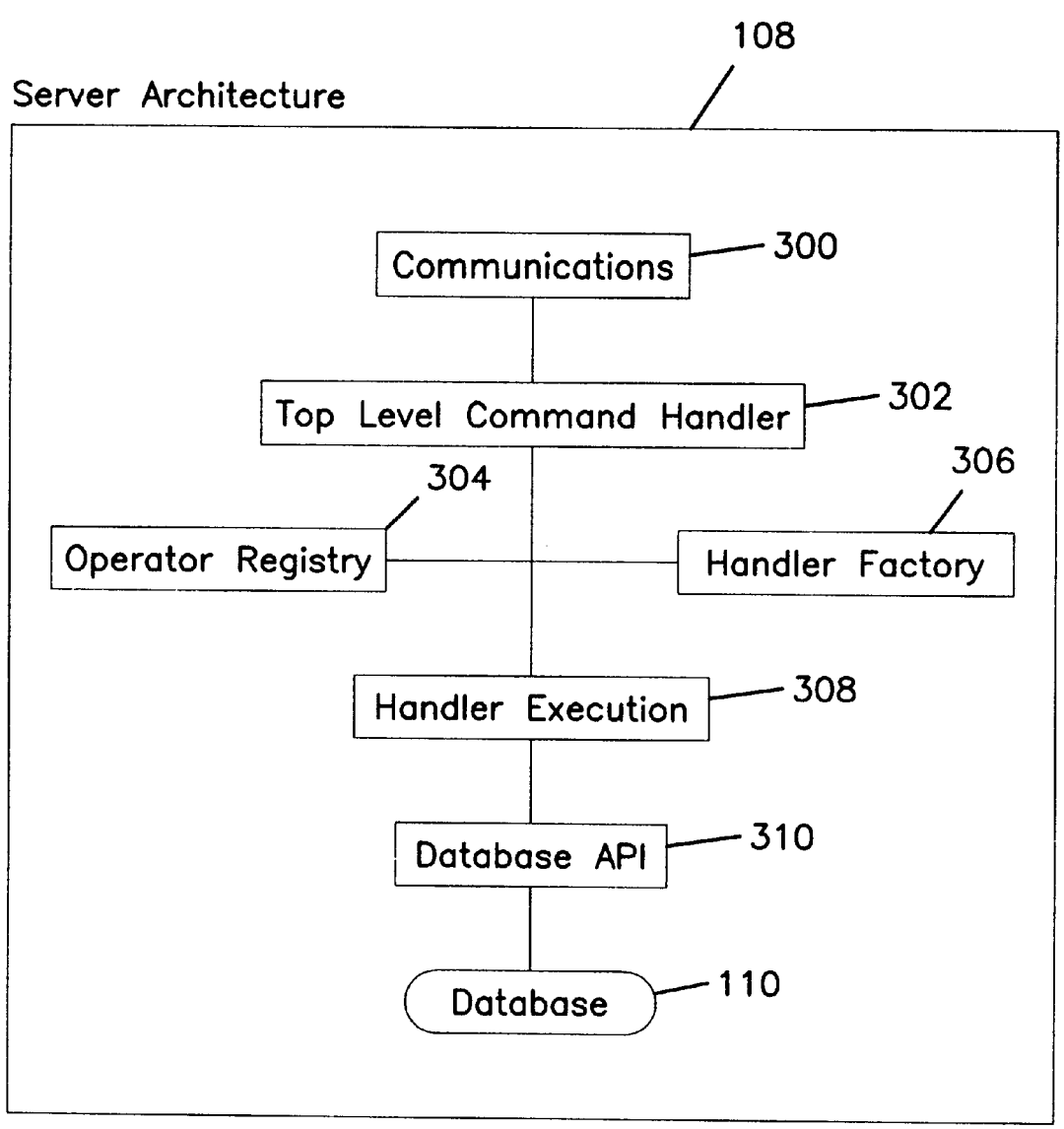
FIG. 3 illustrates the architecture of the T Spaces server according to the present invention.
Figure 4:
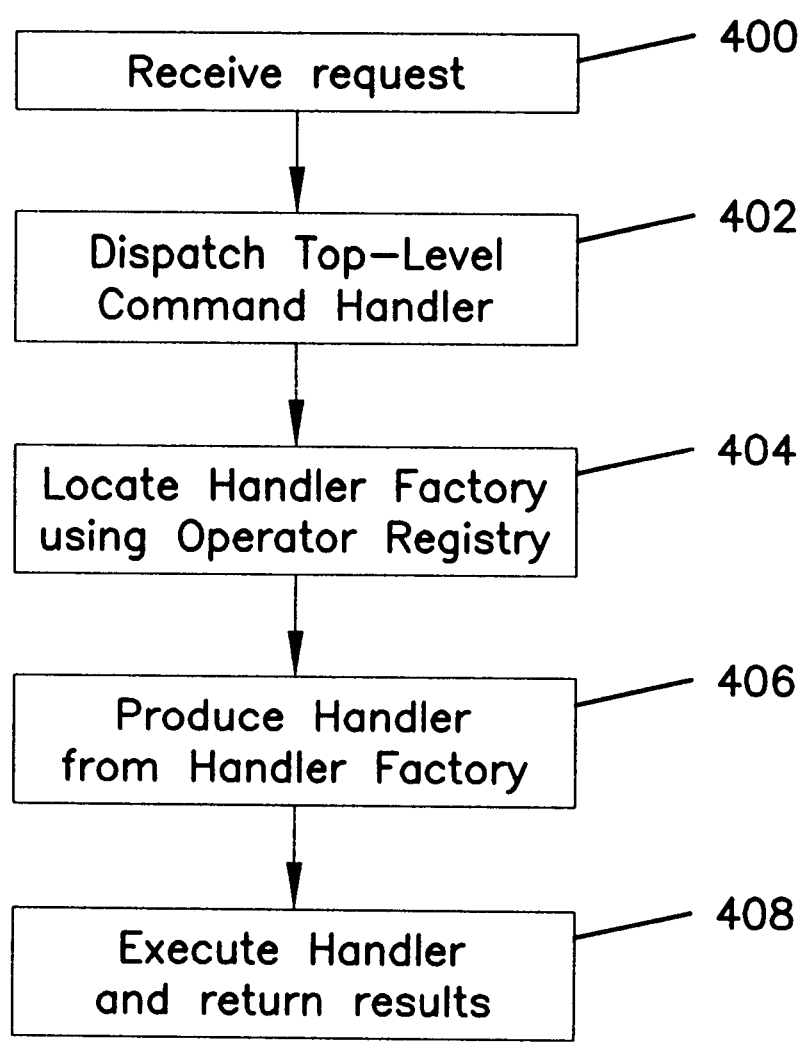
FIG. 4 is a flowchart that illustrates the logic performed by the T Spaces server according to the present invention.

FIG. 3 illustrates the architecture of the T Spaces server 108 according to the present invention and FIG. 4 is a flowchart that illustrates the logic performed by the T Spaces server 108 according to the present invention. The T Spaces server 108 includes a Communications layer 300, Top-Level Command Handler 302, Operator Registry 304, Handler Factory 306, Handler Execution layer 308, Database API (Application Programming Interface) 310, and Database 110 (which actually stores the Tuplespace).

A command or request originates as a method invocation on a T Spaces client 104 or 106. All the information needed to process the request is bundled into the request by the communications layer 202 of the T Spaces client 104 or 106, sent to the T Spaces server 108, and then un-bundled by the Communications layer 300 on the T Spaces server 108 (as indicated by Step 400). Generally, the request comprises one or more operators and its associated parameters (if any).

The T Spaces server 108 dispatches the Top-Level Command Handler 302 upon receiving the request (as indicated by Step 402). The main function of the Top-Level Command Handler 302 is to locate the appropriate Handler Factory 306 for the operator in the request using the Operator Registry 304.

Generally, operators are organized in families. For example, one embodiment of the present invention may include a family for the basic T Space or Tuplespace operators (e.g., Write( ), Take( ), Read( ), etc.), a family for administration operators (e.g., NewUser( ), ChangeUser( ), SetPassword( ), etc.) and a family for operators that manage the T Space system itself (e.g., NewTupleSpace( ), AddFactory( ), DeleteFactory( ), AddHandler( ), DeleteHandler( ), etc.). There is usually one Handler Factory 306 for a particular family.

Given an operator, a tuple, a T Spaces client 104 or 106 identifier, and/or an indication of access control privileges for a T Spaces client 104 or 106, the Handler Factory 306 produces an appropriate handler for the operator (as indicated by Step 404), wherein the handler is an implementation (e.g., program code) for the operator. This architecture provides the maximum flexibility since the Handler Factory 306 may custom-tailor the implementation of the operator's handler to the types of operands or parameters provided with the operator and/or the identity of the invoker of the operator and/or the access control privileges of the invoker.

The operator's handler is dispatched for execution by the Handler Execution 308 (as indicated by Step 406), using the parameters of the operator as input thereto. The handler executes, and then may pass its results back up to the Top-Level Command handler 302, which in turn may pass the results back to the T Spaces client 104 or 106 via the Communications layer 300.

Generally, handlers act on a Tuplespace stored in the T Spaces database 110 through the Database API layer 310. The Database API layer 310 provides the core database functionality necessary to manipulate the Tuplespace. For flexibility and scalability reasons, different Database API 110 implementations may be used in the present invention.

In addition to standard operators, such as Write( ), Read( ), and Take( ), there are also operators, including addHandler( ), changeHandler( ) and deleteHandler( ), that allow new operators to be dynamically defined or existing operators to be dynamically modified in the T Spaces server 108. When a T Spaces client 104 or 106 desires to dynamically modify the functionality of the T Spaces server 108, such as by adding a new operator or modifying an existing operator, it can use the AddHandler operator to define that operator and provide its logic to the T Spaces server 108.

For example, a T Spaces client 104 or 106 issues a command or request to the T Spaces server 108 that includes an addHandler( ) operator having parameters identifying the new operator and its handler. As described above, the T Spaces server 108 dispatches the Top-Level Command Handler 302 upon receiving the request. The Top-Level Command Handler 302 locates the appropriate Handler Factory 306 for the addHandler( ) operator. The Handler Factory 306 then locates the appropriate handler, i.e., Add Handler, for the addHandler( ) operator.

Add Handler is dispatched for execution by the Handler Execution 308, using the parameters of the addHandler( ) operator as input thereto. Add Handler registers the new operator in the Operator Registry 304 under the appropriate or specified family, and also installs the new operator's handler in the appropriate Handler Factory 306. Add Handler then passes its results back up to the Top-Level Command Handler 302, which in turn passes the results back to the T Spaces client 104 or 106 via the Communications layer 300.

Preferably, the components of the T Spaces server 108, including the handlers, are implemented using object oriented design techniques, as described in E. Gamma, R. Helm, R. Johnson, and J. Vlissides, "Design Patterns: Elements of Reusable Object-Oriented Software," Addison Wesley, 1994 (hereinafter referred to as (Gamma 94), which is incorporated by reference herein.

In the preferred embodiment, the Java™ programming language or environment is relied upon to provide the implementation (i.e., program code) for an operator's handler. This allows the movement and execution of operators and handlers over the network 102, because the Java™ programming language employs inherent portability and platform independence. Moreover, Java™ is an interpreted language, and thus provides the ability download the handlers into another computer for execution without recompilation. This is in contrast to other languages, such as C++, that usually require not only recompilation, but also often require rewriting of program code in order to run on other hardware and software platforms.

The factory/handler approach allows the T Spaces to be dynamically customized. New commands may be added to increase functionality, existing command implementations may be changed without halting the system, and command implementations may be customized for their operands or for the client issuing the command or both. Given a command string, a tuple operand, and the client identifier for the issuer of the command, a factory selects an implementation (a handler) to execute the command.

Although it is not a trivial exercise, sophisticated handlers can be developed and downloaded into the T Spaces server 108 for execution. All handlers must implement a standard handler interface, which has a method for executing a command, given the tuple operand of the top -level command. Handler implementers also have available the Database API 310, which allows tuples to move into and out of the T Spaces database 110 and to perform data-related operations on these tuples.

New factories and handlers may be downloaded to the T Spaces server 108 using addFactory and addHandler methods, respectively. Of course, extreme care must be taken when writing new factories and handlers and only designated entities should have the access control privileges to add new factories and handlers.

Conclusion

This concludes the description of the preferred embodiment of the invention. In summary, the present invention comprises a method, apparatus, and article of manufacture for dynamically adding functionality to a server. A first operator is received at the server from an attached client, wherein the first operator indicates that new functionality is to be added to the server. A first handler is located for the first operator. The first handler is executed in the server, wherein the first handler registers a second operator associated with the new functionality and installs a second handler for the second operator to perform the new functionality.

The following describes some alternative ways of accomplishing the present invention. Those skilled in the art will recognize that different computer programming languages, database systems, operating environments, and operating systems could be substituted for those described herein. Those skilled in the art will recognize that the present invention could be used any type of computer system, and need not be limited to a client-server architecture. Those skilled in the art will recognize that the present invention could be used with many types of handler implementation and need not be limited to the example described herein. Those skilled in the art will recognize that alternate approaches to operators and handlers could be substituted for the approach described herein without departing from the scope of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for dynamically adding functionality to a server, comprising the steps of:
   (a) receiving a first operator at the server from an attached client, wherein the first operator indicates that a new functionality is to be added to the server, wherein the new functionality is used to manipulate data stored in a database at the server;
   (b) locating a first handler for the first operator; and
   (c) executing the first handler in the server, wherein the first handler registers a second operator associated with the new functionality and installs a second handler for the second operator to perform the new functionality.

2. The method of claim 1 above, wherein the step of locating the first handler further comprises the step of locating the first handler by searching an operator registry using the first operator.

3. The method of claim 1 above, wherein the server accepts one or more operators and the operators are organized in one or more families.

4. The method of claim 1 above, wherein each of the operators includes zero or more parameters.

5. The method of claim 4 above, wherein the second operator includes one or more parameters selected from a group comprising an identification of the second operator and an implementation of the second handler.

6. The method of claim 1 above, further comprising the steps of:
   (d) receiving the second operator at the server from an attached client, wherein the second operator indicates that the new functionality is to be executed by the server;
   (e) locating the second handler for the second operator; and
   (f) executing the second handler in the server, wherein the second handler performs the new functionality.

7. The method of claim 6 above, wherein the step of executing the second handler further comprises the step of interacting with a database stored on the server.

8. The method of claim 7 above, wherein the database is a tuplespace.

9. The method of claim 6 above, wherein the step of executing the second handler further comprises the step of the second handler interacting with a database stored on the server through a database application programming interface.

10. A method for dynamically adding functionality to a server, comprising the steps of:
    (a) receiving a first operator at the server from an attached client, wherein the first operator indicates that a new functionality is to be added to the server, wherein the new functionality is used to manipulate data stored in a database at the server;
    (b) locating a handler factory for the first operator; and
    (c) executing the first handler in the server, wherein the first handler registers a second operator associated with the new functionality and installs a second handler for the second operator to perform the new functionality.

11. A method for dynamically adding functionality to a server, comprising the steps of:
    (a) receiving a first operator at the server from an attached client, wherein the first operator indicates that a new functionality is to be added to the server, wherein the new functionality is used to manipulate data stored in a database at the server;
    (b) producing a first handler from a handler factory when the first operator is provided to the handler factory; and
    (c) executing the first handler in the server, wherein the first handler registers a second operator associated with the new functionality and installs a second handler for the second operator to perform the new functionality.

12. A method for dynamically adding functionality to a server, comprising the steps of:
    (a) receiving a first operator at the server from an attached client, wherein the first operator indicates that a new functionality is to be added to the server, wherein the new functionality is used to manipulate data stored in a database at the server;
    (b) selecting an appropriate implementation of a first handler from a handler factory using one or more criteria selected from a group comprising the first operator, a tuple, a client identifier, and an access control privilege; and
    (c) executing the first handler in the server, wherein the first handler registers a second operator associated with the new functionality and installs a second handler for the second operator to perform the new functionality.

13. A method for dynamically adding functionality to a server, comprising the steps of:
    (a) receiving a first operator at the server from an attached client, wherein the first operator indicates that a new functionality is to be added to the server, wherein the new functionality is used to manipulate data stored in a database at the server;
    (b) selecting an appropriate implementation of a first handler from a handler factory using one or more criteria selected from a group comprising the first operator, a tuple, a client identifier, and an access control privilege, wherein each family of operators has a handler factory; and (c) executing the first handler in the server, wherein the first handler registers a second operator associated with the new functionality and installs a second handler for the second operator to perform the new functionality.

14. A computer-implemented apparatus for dynamically adding functionality to a server, comprising:

(a) a server; and (b) one or more instructions, performed by the server, for receiving a first operator at the server from an attached client, wherein the first operator indicates that a new functionality is to be added to the server, wherein the new functionality is used to manipulate data stored in a database at the server;

(c) one or more instructions, performed by the server, for locating a first handler for the first operator; and (d) one or more instructions, performed by the server, for executing the first handler in the server, wherein the first handler registers a second operator associated with the new functionality and installs a second handler for the second operator to perform the new functionality.

15. The computer-implemented apparatus of claim 14 above, wherein the means of locating the first handler further comprises one or more instructions, performed by the server for locating the first handler by searching an operator registry using the first operator.

16. The computer-implemented apparatus of claim 14, wherein each of the operators includes zero or more parameters.

17. The computer-implemented apparatus of claim 16, wherein the second operator includes one or more parameters selected from a group comprising an identification of the second operator and an implementation of the second handler.

18. The computer-implemented apparatus of claim 14, further comprising the means of:

(d) one or more instructions, performed by the server for receiving the second operator at the server from an attached client, wherein the second operator indicates that the new functionality is to be executed by the server;

(e) one or more instructions, performed by the server for locating the second handler for the second operator; and (f) one or more instructions, performed by the server for executing the second handler in the server, wherein the second handler performs the new functionality.

19. The computer-implemented apparatus of claim 18, wherein the means of executing the second handler further comprises one or more instructions, performed by the server for interacting with a database stored on the server.

20. The computer-implemented apparatus of claim 19, wherein the database is a tuplespace.

21. The computer-implemented apparatus of claim 18, wherein the means of executing the second handler further comprises one or more instructions, performed by the server for interacting the second handler with a database stored on the server through a database application programming interface.

22. An article of manufacture comprising a carrier tangibly embodying one or more instructions that when executed by a computer causes the computer to perform a method for dynamically adding functionality to a server, the method comprising the steps of:

(a) receiving a first operator at the server from an attached client, wherein the first operator indicates that a new functionality is to be added to the server, wherein the new functionality is used to manipulate data stored in a database at the server;

(b) locating a first handler for the first operator; and (c) executing the first handler in the server, wherein the first handler registers a second operator associated with the new functionality and installs a second handler for the second operator to perform the new functionality.

23. The article of manufacture of claim 22 above, wherein the step of locating the first handler further comprises the step of locating the first handler by searching an operator registry using the first operator.

24. The article of manufacture of claim 22, wherein the server accepts one or more operators and the operators are organized in one or more families.

25. The article of manufacture of claim 22, wherein each of the operators includes zero or more parameters.

26. The article of manufacture of claim 25, wherein the second operator includes one or more parameters selected from a group comprising an identification of the second operator and an implementation of the second handler.

27. The article of manufacture of claim 22, further comprising the steps of:

(d) receiving the second operator at the server from an attached client, wherein the second operator indicates that the new functionality is to be executed by the server;

(e) locating the second handler for the second operator; and (f) executing the second handler in the server, wherein the second handler performs the new functionality.

28. The article of manufacture of claim 27, wherein the step of executing the second handler further comprises the step of interacting with a database stored on the server.

29. The article of manufacture of claim 28, wherein the database is a tuplespace.

30. The article of manufacture of claim 26, wherein the step of executing the second handler further comprises the step of the second handler interacting with a database stored on the server through a database application programming interface.

31. A computer-implemented apparatus for dynamically adding functionality to a server, comprising:

(a) a server; and (b) one or more instructions, performed by the server, for receiving a first operator at the server from an attached client, wherein the first operator indicates that a new functionality is to be added to the server, wherein the new functionality is used to manipulate data stored in a database at the server;

(c) one or more instructions, performed by the server, for locating a handler factory for the first operator; and (d) one or more instructions, performed by the server, for executing the first handler in the server, wherein the first handler registers a second operator associated with the new functionality and installs a second handler for the second operator to perform the new functionality.

32. A computer-implemented apparatus for dynamically adding functionality to a server, comprising:

(a) a server; and (b) one or more instructions, performed by the server, for receiving a first operator at the server from an attached client, wherein the first operator indicates that a new functionality is to be added to the server, wherein the new functionality is used to manipulate data stored in a database at the server;

(c) one or more instructions, performed by the server, for producing a first handler from a handler factory when the first operator is provided to the handler factory; and (d) one or more instructions, performed by the server, for executing the first handler in the server, wherein the first handler registers a second operator associated with the new functionality and installs a second handler for the second operator to perform the new functionality.

33. A computer-implemented apparatus for dynamically adding functionality to a server, comprising:

(a) a server; and (b) one or more instructions, performed by the server; for receiving a first operator at the server from an attached client, wherein the first operator indicates that a new functionality is to be added to the server, wherein the new functionality is used to manipulate data stored in a database at the server;

(c) one or more instructions, performed by the server, for selecting an appropriate implementation of the first handler from the handler factory using one or more criteria selected from a group comprising the first operator, a tuple, a client identifier, and an access control privilege; and (d) one or more instructions, performed by the server, for executing the first handler in the server, wherein the first handler registers a second operator associated with the new functionality and installs a second handler for the second operator to perform the new functionality.

34. A computer-implemented apparatus for dynamically adding functionality to a server, comprising:

(a) a server; and (b) one or more instructions, performed by the server, for receiving a first operator at the server from an attached client, wherein the first operator indicates that a new functionality is to be added to the server, wherein the new functionality is used to manipulate data stored in a database at the server;

(c) one or more instructions, performed by the server, for selecting an appropriate implementation of the first handler from the handler factory using one or more criteria selected from a group comprising the first operator, a tuple, a client identifier, and an access control privilege, wherein each family of operators has a handler factory; and (d) one or more instructions, performed by the server, for executing the first handler in the server, wherein the first handler registers a second operator associated with the new functionality and installs a second handler for the second operator to perform the new functionality.

35. An article of manufacture for dynamically adding functionality to a server, comprising the steps of:

(a) receiving a first operator at the server from an attached client, wherein the first operator indicates that a new functionality is to be added to the server, wherein the new functionality is used to manipulate data stored in a database at the server;

(b) locating a handler factory for the first operator; and (c) executing the first handler in the server, wherein the first handler registers a second operator associated with the new functionality and installs a second handler for the second operator to perform the new functionality.

36. An article of manufacture for dynamically adding functionality to a server, comprising the steps of:

(a) receiving a first operator at the server from an attached client, wherein the first operator indicates that a new functionality is to be added to the server, wherein the new functionality is used to manipulate data stored in a database at the server;

(b) producing a first handler from a handler factory when the first operator is provided to the handler factory; and (c) executing the first handler in the server, wherein the first handler registers a second operator associated with the new functionality and installs a second handler for the second operator to perform the new functionality.

37. An article of manufacture for dynamically adding functionality to a server, comprising the steps of:

(a) receiving a first operator at the server from an attached client, wherein the first operator indicates that a new functionality is to be added to the server, wherein the new functionality is used to manipulate data stored in a database at the server;

(b) selecting an appropriate implementation of a first handler from a handler factory using one or more criteria selected from a group comprising the first operator, a tuple, a client identifier, and an access control privilege; and (c) executing the first handler in the server, wherein the first handler registers a second operator associated with the new functionality and installs a second handler for the second operator to perform the new functionality.

38. An article of manufacture for dynamically adding functionality to a server, comprising the steps of:

(a) receiving a first operator at the server from an attached client, wherein the first operator indicates that a new functionality is to be added to the server, wherein the new functionality is used to manipulate data stored in a database at the server;

(b) selecting an appropriate implementation of a first handler from a handler factory using one or more criteria selected from a group comprising the first operator, a tuple, a client identifier, and an access control privilege, wherein each family of operators has a handler factory; and (c) executing the first handler in the server, wherein the first handler registers a second operator associated with the new functionality and installs a second handler for the second operator to perform the new functionality.

* * * * *